Sept. 21, 1965     P. POLLAK, JR     3,207,363
TRAY DISPENSING AND POSITIONING DEVICE
Filed June 5, 1963                     2 Sheets-Sheet 1

INVENTOR
PHILIP POLLAK, JR.
BY
*James E. Gadena*
ATTORNEY

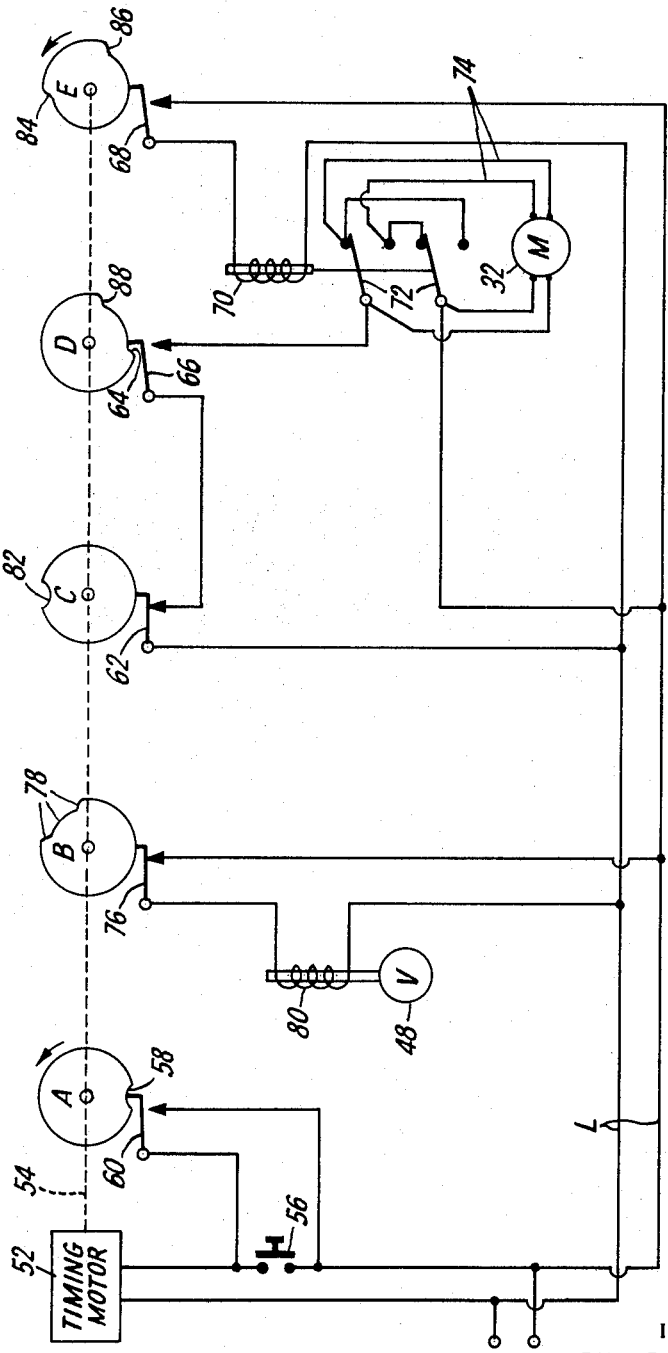

United States Patent Office 3,207,363
Patented Sept. 21, 1965

3,207,363
TRAY DISPENSING AND POSITIONING DEVICE
Philip Pollak, Jr., Stamford, Conn., assignor to American Machine & Foundry Company, a corporation of New Jersey
Filed June 5, 1963, Ser. No. 285,742
1 Claim. (Cl. 221—211)

This invention relates to apparatus for individually removing disposable plates or trays from a stack and placing or otherwise delivering them at a receiving station or conveyor.

The principal object of this invention is to provide a dependable, rapidly operating and relatively simple apparatus for taking a single item such as a paper plate or tray from an inverted stack and releasing this item in an upright position.

Briefly, in accordance with this invention there are provided a device for holding an inverted stack of the plates or trays, and a suction head movable through a substantially semi-circular path between a position to engage and hold the uppermost plate or tray and a second position wherein the same is released in an upright position.

Further objects, advantages and details of this invention will become apparent from the following description, but read in conjunction with the accompanying drawings in which:

FIGURE 3 is a schematic wiring diagram of the control circuit portion of this apparatus.

Figure 1:
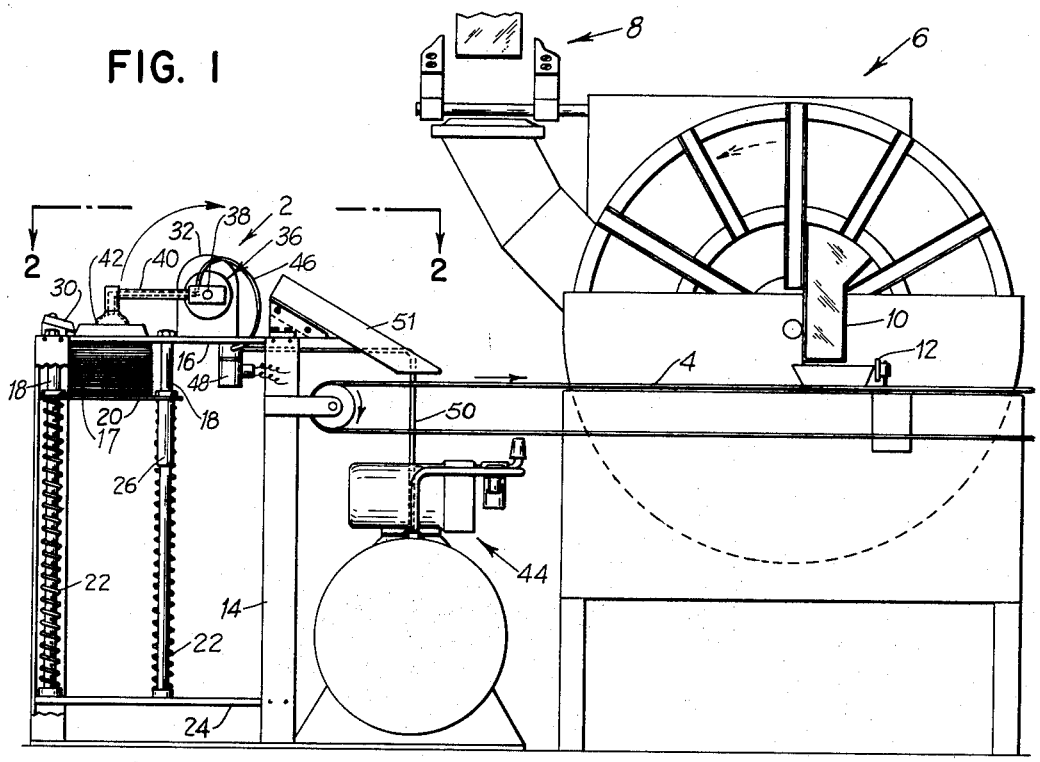
FIGURE 1 is a side view of apparatus in accordance with this invention as applied in conjunction with apparatus for frying foods.

The present apparatus is primarily intended to handle the common types of disposable eating utensils which are commonly referred to as "trays," "plates" or "baskets," and are usually formed of paper, metallic foil or plastic materials. For purposes of disclosure herein, such a utensil will be referred to and designated hereafter as a "tray." The tray dispensing apparatus is generally indicated at 2 and is shown in an installation in which its function is to deliver trays to a conveyor 4 which carries the trays past a rotary food fryer 6. Individual portions of food are delivered to the fryer 6 by means of an automatic tray dumping mechanism 8, the mechanism 8 being adapted to receive trays containing the individual portions and empty the trays into the fryer. Food is carried through the hot fat in the fryer and is finally discharged into a chute 10 which guides the food downwardly into an awaiting tray that is being restrained by a gate 12 extending across the conveyor 4. Through detecting means forming no part of the present invention, the gate 12 is then opened to permit delivery of the filled tray by the conveyor 4 to its destination, and a signal is transmitted to the dispenser 2 to cause it to deliver to the conveyor another tray to be held in readiness for the next fried portion of food.

The dispenser 2 has a main framework indicated generally at 14 and including an upper table or platform 16. The means for storing a stack 17 of trays includes four vertical guide rods 18 and a stack supporting plate 20 having openings through which the rods 18 extend in slideable fashion. A compression coil spring 22 encircles each of two diagonally opposite rods 17 and bears against a fixed frame structure 24 at the lower end and the underside of a stack supporting plate 20 at the upper end. At its other two corners the supporting plate 20 carries sleeves 26 through which rods extend by means of which the plate is stabilized. By virtue of springs 22 the supporting plate 20 is urged upwardly and forces the upper end of the stack 17 through an opening 28 in platform 16.

The opening 28, of course, is sufficiently small that it provides some resistance to removal of the uppermost tray from the stack. Also, there is provided a knife-like member 30 which rides over the edge of a tray being lifted and engages the side of the lower tray that is nested within it to retain this lower tray on the stack and thereby prevent unintentional removal of two or more trays.

The mechanism for removing the uppermost tray from the stack comprises a reversible electric motor 32 having an output shaft 34 which is connected to a secondary coaxial drive shaft 38 by a friction type slip clutch 36. On the shaft 38 there is secured an arm 40 which carries at its free end a suction head 42 in the form of a cup shaped element. A bore extending lengthwise through arm 40 to the interior of suction head 42 provides an air passage which is connected to a vacuum pump installation which is generally indicated at 44. This connection comprises a conduit 46 leading from the air passage in arm 40 to a solenoid-operated valve 48, which in turn is connected to the vaccum pump assembly 44 through a conduit 50. Valve 48 is operable to turn on or off the vacuum applied to suction head 42.

Figure 2:
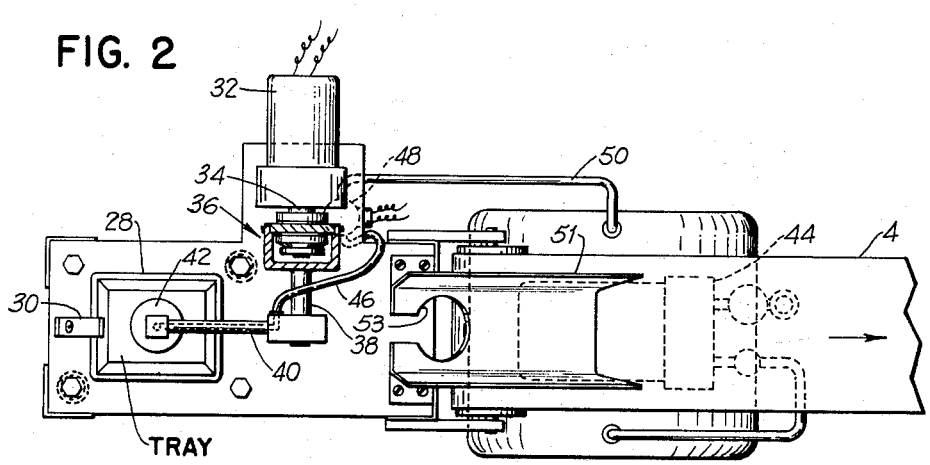
FIGURE 2 is a plan view of this apparatus.

A chute 51 leads downwardly to conveyor 4 and has an aperture or cut-out portion 53 through which the arm 40 and suction head 42 can pass when they are rotated clockwise through more than 180 degrees from the position shown in FIGURES 1 and 2. Chute 51, with the cut-out portion 53, is adapted to effect a stripping action to insure release of a tray from the suction head 42.

The control circuit for this apparatus will be described with reference to FIGURE 3. Each cycle of operation is controlled by a timing motor 52 and five cams designated A, B, C, D and E which are driven by the output shaft 54 of the timing motor. The operation of the timing motor 52 to begin a cycle of operation is initated by the closing of a switch 56, which can be operated either manually or through an automatic order system which is coordinated with other equipment as, for example, the fryer 6. The cams A, B, C, D and E are shown in their inactive rest condition, and in each cycle of operation are rotated in a counter-clockwise direction through 360 degrees. Immediately upon the closure of switch 56, the movement of the depression 58 in cam A away from a cam-actuated switch 60 will effect closing thereof. Switch 60 is connected in parallel with switch 56 and therefore takes over the continued operation of the timing motor 52 through the remainder of the cycle of operation. A cam-operated switch 62 is closed when in the rest position, but a cam-operated switch 66 in series with switch 62 is opened at the beginning of the cycle of operation and is closed only after timing motor 52 has rotated cam D to bring a step 64 of the cam past the switch 66. A cam-operated switch 68 is opened during the first portion of the cycle of operation and is operable to effect energization of a reversing relay having a coil 70 and double throw switches 72. The function of switches 72 is to effect a reversal of motor 32 through reversal of polarity in leads 72. In the initial stage of operation the switches 72 are in the position shown in FIGURE 3, and immediately upon closure of switch 66 power is supplied to the motor 32. At this time a cam-actuated switch 76 is closed, and this switch serves to effect energization of the solenoid 80 which controls the air valve 48. When solenoid 80 is energized vacuum is connected to the suction head 42. Thus the suction head 42 is now being driven in a clockwise direction from the position shown in FIGURE 1 toward the chute 51. The timing of the control circuit is such that as the suction head 42 and a tray held thereto by suction approach the chute 52 a depression 78 in cam B reaches the switch 76 and causes it to open, thereby deenergizing solenoid 80 to interrupt the application of suction. Simultaneously, a depression 82 in cam C momentarily effects an opening of switch 62 to interrupt temporarily the power supply to driving motor 32 while a lobe 84 on cam E closes switch 68 to reverse the switches 72 through energization of coil 70. In the meanwhile, momentum of head 42 and arm 40 carries them through the aperture 53 and the tray is deposited on the chute 51, the interruption of suction during this time being continued due to the circumferential extent of the depression of 78 in cam B. After depression 82 in cam C passes the switch 62 the power to motor 32 is restored and, due to reversal of switches 72 through the effect of lobe 84, the motor 32 now reverses and drives arm 40 and suction head 42 in a counter-clockwise direction toward the rest position shown in FIGURES 1 and 2. As the suction head 42 approaches the stack of trays the power to motor 32 will be cut off by the drop in cam D at 88, which opens switch 66, and substantially concurrently the drop 86 in cam E reopens the switch 68 to effect reversal of the switches 72. It will be understood that by virtue of the momentum of arm 40 and suction head 42, and the provision of the slip clutch 36, the suction head 42, will be carried fully into engagement with the uppermost tray of the stack. Finally, the depression 58 in cam A again reaches switch 60, opening the same and turning off the timing motor 52. The cycle of operation is now complete. By virtue of the continually closed condition of switch 76, the suction head 42 is continually connected to its vacuum source and is in readiness for the next cycle of operation.

It will be understood that various departures from the specifically disclosed embodiment of the invention can be effected without departing from the scope thereof as defined by the following claim.

What is claimed is:

A self-controlled and self-powered apparatus for dispensing trays or the like, comprising in combination means for supporting a vertical stack of inverted trays, compressed spring means urging said stock of trays upward, a suction head, means mounting said suction head for rotation about a horizontal axis adjacent said stack, said suction head thereby being movable between a first position of engagement with the uppermost inverted tray in said stack and a second tray delivery position wherein said tray is released in upright position, a source of vacuum, means connecting said source to said suction head including a valve, a reversible electric motor, a driving connection between said motor and said suction head to transmit rotary motion thereto, a frictionally engaged slip clutch interposed in said driving connection, means for stripping a tray from said suction head at it reaches said second position, and a system controlling the operation of said valve and motor in a cycle of operation, said system including cam control means to actuate each function of said cycle, said functions including: (i) means effecting energization of said motor only briefly to initiate movement of the suction head from the first toward the second position, (ii) de-energizing the motor prior to the suction head reaching the second position, (iii) re-energizing the motor briefly to start return of the suction head to the first position, and (iv) closing said valve momentarily as said suction head reaches said second position.

References Cited by the Examiner

UNITED STATES PATENTS

| | | | |
|---|---|---|---|
| 794,146 | 7/05 | Ericson. | |
| 1,318,317 | 10/19 | Elsas | 221—279 |
| 1,813,372 | 7/31 | Wildhaber | 192—56 |
| 1,844,285 | 2/32 | Johnson | 221—279 |
| 2,334,965 | 11/43 | Thacker | 318—281 |
| 2,546,193 | 3/51 | Lindstaedt et al. | 222—211 |
| 2,889,962 | 6/59 | Foster | 221—211 |
| 2,954,900 | 10/60 | Brubaker | 221—297 |
| 3,108,714 | 10/63 | O'Brien | 221—276 |

FOREIGN PATENTS

| | | |
|---|---|---|
| 168,784 | 8/51 | Austria. |

RAPHAEL M. LUPO, *Primary Examiner.*

LOUIS J. DEMBO, *Examiner.*